United States Patent Office 2,713,069
Patented July 12, 1955

2,713,069

PREPARATION OF CARBOCYCLIC BICYCLIC KETONES

Angelo J. Speziale, Kirkwood, Mo., assignor to Monsanto Chemical Company, St. Louis, Mo., a corporation of Delaware No Drawing. Application May 21, 1953,
Serial No. 356,583

6 Claims. (Cl. 260—586)

This invention relates to a process of preparing carbocyclic bicyclic ketones. More particularly this invention relates to a process for preparing 2-keto-4a-methyl-1,2,4a,5,8,8a-hexahydronaphthalene.

In accordance with this invention it has been found that 2-keto-4a-methyl-1,2,4a,5,8,8a-hexahydronaphthalene can be readily prepared by heating a hydrocarbonoxy substituted naphthalene of the structural formula

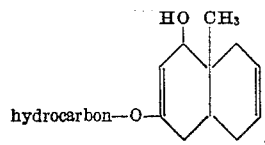

in the presence of aqueous acid, preferably a dilute mineral acid such as dilute sulfuric acid, dilute hydrochloric acid, dilute hydrobromic acid, etc.

The aqueous acid hydrolysis of the above described 2-hydrocarbonoxy - 4 - hydroxy-4a-methyl-1,4,4a,5,8,8a-hexahydronaphthalene takes place smoothly in a short period of time and the usual temperature range is about 20° C. to about reflux but preferably at about 70° C. to about 100° C. Among the hydrocarbon groups contemplated are the aryl radicals such as phenyl, tolyl, xylyl, biphenyl, etc., the aralkyl radicals such as benzyl, phenethyl, etc., the cycloalkyl radicals such as cyclohexyl and the alkyl radicals such as methyl, ethyl, propyl, butyl, amyl, hexyl, octyl, etc. It is preferred that the hydrocarbon group be a short chain alkyl radical, i. e. one containing from 1 to 5 carbon atoms.

As illustrative of the process of this invention is the following:

Example I

Substantially 5 parts by weight of 2-methoxy-4-hydroxy-4a-methyl - 1,4,4a,5,8,8a - hexahydronaphthalene is intimately mixed with 10 parts by weight of 10% hydrochloric acid. The suspension so obtained is heated at about 70° C. for about 2 hours. The mix is cooled to about room temperature and then extracted with three 20 parts by weight portions of diethyl ether. The ether extracts are combined, washed with water, then washed with 5% aqueous sodium bicarbonate, and finally with water. The ether solution is dried over anhydrous sodium sulfate and then subjected to vacuum distillation to remove the ether solvent. A yield in excess of 90% of 2-keto-4a-methyl-1,2,4a,5,8,8a-hexahydronaphthalene is obtained.

Example II

Substantially 10 parts by weight of dl-trans-2-methoxy-4 - hydroxy - 4a - methyl-1,4,4a,5,8,8a-hexahydronaphthalene is intimately mixed with 25 parts by weight of 10% sulfuric acid. The suspension so obtained is heated at about 80–85° C. for about 3 hours. The mix is cooled to about room temperature and then extracted with three 30 parts by weight portions of diethyl ether. The ether extracts are combined, washed with water, then washed with 5% aqueous sodium bicarbonate, and finally with water. The ether solution is dried over anhydrous sodium sulfate and then subjected to vacuum distillation to remove the ether solvent. A yield in excess of 95% of dl-trans - 2 - keto-4a-methyl-1,2,4a,5,8,8a-hexahydronaphthalene is obtained.

Example III

Substantially 5 parts by weight of l-trans-2-methoxy-4-hydroxy - 4a - methyl-1,4,4a,5,8,8a-hexahydronaphthalene is intimately mixed with 10 parts by weight of 10% sulfuric acid. The suspension so obtained is heated at about 80–85° C. for about 2 hours. The mix is cooled to about room temperature and then extracted with three 20 parts by weight portions of diethyl ether. The ether extracts are combined, washed with water, then washed with 5% aqueous sodium bicarbonate, and finally with water. The ether solution is dried over anhydrous sodium sulfate and then subjected to vacuum distillation to remove the ether solvent. A yield in excess of 95% l-trans-2-keto-4a-methyl - 1,2,4a,5,8,8a - hexahydronaphthalene is obtained.

The hydrocarbonoxy substituted naphthalene reactants of this invention, namely those of the structural formula

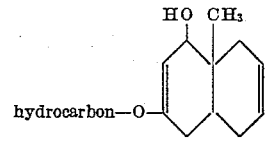

may be prepared by reacting a 2-hydrocarboxy-4-keto-4a-methyl-1,4,4a,5,8,8a-hexahydronaphthalene with lithium aluminum hydride in an anhydrous medium containing a lower aliphatic ether solvent such as tetrahydrofuran, diethyl ether, di-isopropyl ether, etc. The amount of lithium aluminum anhydride may be varied, as for example anywhere from about 0.25 to about 2.0 molecular equivalents per molecular equivalent of hydrocarbonoxy hexahydronaphthalenone reactant, however, amounts in the range of 0.5–1.0 molecular equivalents of lithium aluminum hydride is preferred. The temperature of this reaction may vary widely, however, it is preferred that temperatures in the range of about 0 to about 50° C. be employed.

Another aspect of this invention is in the preparation of 2 - keto-4a-methyl-1,2,4a,5,8,8a-hexahydronaphthalene from a crude 2-hydrocarbonoxy-4-hydroxy-4a-methyl-1,4,4a,5,8,8a-hexahydronaphthalene which crude is obtained from a 2-hydrocarbonoxy - 4 - keto - 4a - methyl-1,4,4a,5,8,8a-hexahydronaphthalene as described above.

As illustrative of this embodiment is the following:

Example IV

Substantially 30.2 parts by weight of lithium aluminum anhydride, substantially 237 parts by weight of l-trans-2-methoxy-4-keto-1,4,4a,5,8,8a-hexahydronaphthalene, and substantially 2205 parts by weight of anhydrous diethyl ether are intimately mixed, maintaining the temperature at about 25–35° C. for about 90 minutes. The mix is then cautiously quenched with about 150 parts by weight of cold water. The slurry so obtained is then cooled to about 5° C. and thereupon acidified with approximately 800 parts by weight of 10% sulfuric acid. The aqueous layer is separated and washed with two 200 parts by weight portions of diethyl ether. The ether washings are combined with the original ether layer and then subjected to vacuum distillation to remove the ether solvent. The oil so obtained is then admixed with approximately 300 parts by weight of 10% sulfuric acid and the suspension so obtained heated at about 100° C. for about 3 hours. The mix is cooled and extracted with two 350 parts by weight portions of diethyl ether. The ether extracts are combined, washed with water followed by 5% aqueous sodium bicarbonate and finally water. The ether solution is dried over anhydrous sodium sulfate and then subjected to vacuum distillation to remove the ether solvent. A yield of approximately 95% by weight of $l$-trans-2-keto-4a-methyl - 1,2,4a,5,8,8a - hexahydronaphthalene is obtained.

Although the present invention has been described with respect to certain embodiments it is not so limited and it is to be understood that variations and modifications thereof may be made obvious to those skilled in the art without departing from the spirit or scope of this invention.

This application is a continuation-in-part of my copending applications Serial No. 325,703, filed December 12, 1952 and Serial No. 326,159, filed December 15, 1952.

What is claimed is:

1. In the method of making 2 - keto - 4a - methyl-1,2,4a,5,8,8a-hexahydronaphthalene the step which comprises hydrolyzing a 2-hydrocarbonoxy-4-hydroxy-4a-methyl-1,4,4a,5,8,8a-hexahydronaphthalene wherein the hydrocarbon radical of the hydrocarbonoxy substituent is a member of the group consisting of aryl, aralkyl, alkyl and cycloalkyl radicals in the presence of aqueous mineral acid.

2. In the method of making trans-2-keto-4a-methyl-1,2,4a,5,8,8a-hexahydronaphthalene the step which comprises hydrolyzing a trans-2-short chain alkoxy-4-hydroxy-4a-methyl-1,4,4a,5,8,8a-hexahydronapthalene by heating in the presence of aqueous mineral acid.

3. The process of claim 2 wherein the alkyl radical of the short chain alkoxy group is methyl.

4. In the method of making $dl$-trans-2-keto-4a-methyl-1,4,4a,5,8,8a-hexahydronaphthalene the step which comprises heating in the presence of dilute sulfuric acid $dl$-trans - 2 - methoxy - 4 - hydroxy-4a-methyl-1,4,4a,5,8,8a-hexahydronaphthalene.

5. In the method of making $l$-trans-2-keto-4a-methyl-1,2,4a,5,8,8a-hexahydronaphthalene the step which comprises hydrolyzing $l$-trans - 2 - methoxy - 4 - -hydroxy-4a-methyl-1,4,4a,5,8,8a-hexahydronaphthalene by heating in the presence of dilute sulfuric acid.

6. The process which comprises reacting in an aliphatic ether solvent under anhydrous conditions lithium aluminum anhydride and 2-methoxy-4-keto-4a-methyl-1,4,4a,5,8,8a - hexahydronaphthalene, hydrolyzing the crude 2-methoxy - 4 - hydroxy-4a-methyl-1,4,4a,5,8,8a-hexahydronaphthalene so obtained by subjecting same to heat in the presence of dilute mineral acid and recovering 2-keto-4a-methyl-1,2,4a,5,8,8a-hexahydronaphthalene.

References Cited in the file of this patent

UNITED STATES PATENTS 2,672,482    Woodward _____ Mar. 16, 1954

OTHER REFERENCES

Woodward et al., Jour. Am. Chem. Soc., vol. 74, No. 17, Sept. 6, 1952, 4224–4226.